US009444609B2

(12) United States Patent
Rousu

(10) Patent No.: US 9,444,609 B2
(45) Date of Patent: Sep. 13, 2016

(54) RF FRONT END ARRANGEMENT AND METHOD FOR SHARING FIRST AND SECOND ANTENNAS BY DIFFERENT FREQUENCY BANDS

(71) Applicant: Broadcom Corporation, Irvine, CA (US)

(72) Inventor: Seppo Olavi Rousu, Oulu (FI)

(73) Assignee: BROADCOM CORPORATION, Irvine, CA (US)

( * ) Notice: Subject to any disclaimer, the term of this patent is extended or adjusted under 35 U.S.C. 154(b) by 67 days.

(21) Appl. No.: 14/243,151

(22) Filed: Apr. 2, 2014

(65) Prior Publication Data

US 2014/0293841 A1    Oct. 2, 2014

(30) Foreign Application Priority Data

Apr. 2, 2013  (GB) .................................. 1305885.4
Apr. 15, 2013 (GB) .................................. 1306821.8

(51) Int. Cl.
| | |
|---|---|
| H04B 7/005 | (2006.01) |
| H04L 5/08 | (2006.01) |
| H04L 5/14 | (2006.01) |
| H04B 7/26 | (2006.01) |
| H04B 1/00 | (2006.01) |
| H04B 1/40 | (2015.01) |
| H04L 5/00 | (2006.01) |
| H04L 5/16 | (2006.01) |

(52) U.S. Cl.
CPC ................ *H04L 5/08* (2013.01); *H04B 1/006* (2013.01); *H04B 1/40* (2013.01); *H04B 7/2621* (2013.01); *H04L 5/001* (2013.01); *H04L 5/0023* (2013.01); *H04L 5/0028* (2013.01); *H04L 5/1461* (2013.01); *H04L 5/16* (2013.01)

(58) Field of Classification Search
None
See application file for complete search history.

(56) References Cited

U.S. PATENT DOCUMENTS

| | | | |
|---|---|---|---|
| 7,656,251 B1* | 2/2010 | Bauder et al. ................. | 333/133 |
| 8,565,701 B2* | 10/2013 | Sanchez et al. ........... | 455/168.1 |
| 2005/0079847 A1* | 4/2005 | Arafa ............................ | 455/272 |
| 2006/0079275 A1* | 4/2006 | Ella et al. .................. | 455/553.1 |
| 2006/0189277 A1* | 8/2006 | Ranta et al. .................... | 455/78 |
| 2007/0254692 A1* | 11/2007 | McCoy ....................... | 455/553.1 |
| 2008/0285531 A1* | 11/2008 | Okuyama et al. ............ | 370/338 |
| 2011/0292844 A1 | 12/2011 | Kwun et al. | |
| 2012/0327821 A1 | 12/2012 | Lin et al. | |
| 2013/0217398 A1* | 8/2013 | Winiecki ................ | H04L 5/001 455/450 |
| 2013/0265912 A1* | 10/2013 | Ikonen et al. ................ | 370/278 |
| 2014/0055210 A1* | 2/2014 | Black ..................... | H04B 1/525 333/132 |
| 2015/0087245 A1* | 3/2015 | Hadji-Abdolhamid | ............................ H04B 1/0057 455/77 |

FOREIGN PATENT DOCUMENTS

| | | |
|---|---|---|
| JP | 2007324711 | 12/2007 |
| WO | 2005104389 | 11/2005 |
| WO | 2009079701 | 7/2009 |
| WO | 2013131047 | 9/2013 |

* cited by examiner

*Primary Examiner* — Otis L Thompson, Jr.
(74) *Attorney, Agent, or Firm* — Oblon, McClelland, Maier & Neustadt, L.L.P.

(57) ABSTRACT

An RF front end arrangement comprises first filtering, second filtering, third filtering, fourth filtering and a switching arrangement. The switching arrangement is configured to selectively connect the filtering to plural antennas such that at a particular time the first and third filtering is connected to a first antenna and the second and fourth filtering is connected to a second antenna. This allows filtering with different frequency response characteristics to be in use simultaneously for the same frequency band. This can reduce the insertion loss associated with a signal path.

17 Claims, 16 Drawing Sheets

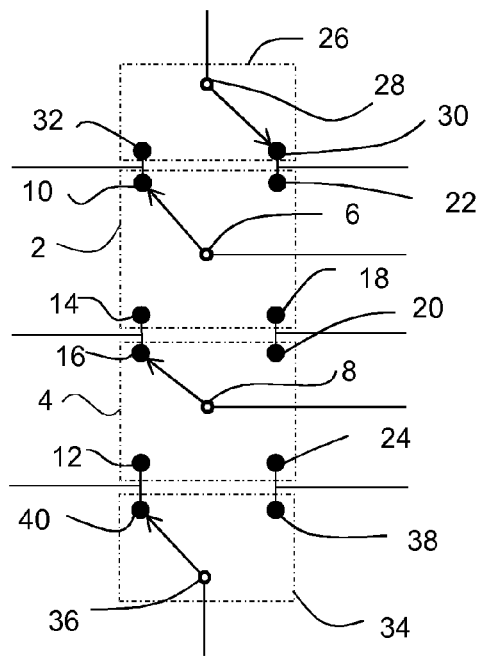
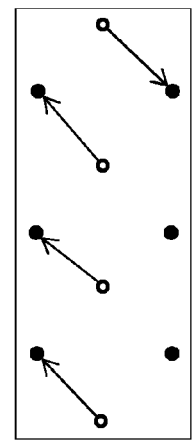
Fig. 3    Fig. 3A
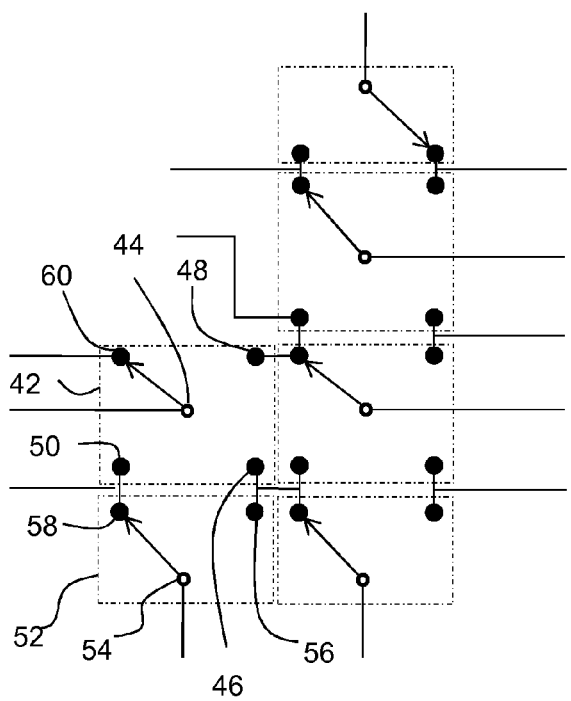
Fig. 6

RF FRONT END ARRANGEMENT AND METHOD FOR SHARING FIRST AND SECOND ANTENNAS BY DIFFERENT FREQUENCY BANDS

TECHNICAL FIELD

The present invention relates to an radio frequency (RF) front end arrangement and method of sharing antennas. It can allow a first antenna and a second antenna to be shared by different frequency bands at the same time. Applications include multi carrier HSPA, Carrier Aggregation (CA) in different variations, Multiple In Multiple Out (MIMO), Uplink (UL) MIMO and simultaneous use of different Radio Access Technologies (RAT).

BACKGROUND

As mobile communication technology develops the number of frequency bands on which data can be transmitted continues to increase. As of 3GPP Release 11 there are many frequency band allocations defined which can be used for transmission and/or reception of data using frequency division duplexing (FDD) or time division duplexing (TDD). The frequency of the uplink portion, downlink portion and available bandwidth vary for each frequency band allocation. Although it is possible to provide an antenna which will operate across these frequency bands, band specific frequency selective filtering is required for component carriers.

For FDD the band specific frequency selective filtering may be more complicated and have a higher insertion loss for duplex operation than simplex operation, for example filtering for reception or transmission only. Insertion loss is the loss in power due to the insertion of a component into the signal path.

Carrier Aggregation (CA) allows higher data rates by transmitting and/or receiving data over two or more carriers. The carriers can in general be in the same or different frequency band allocations. Furthermore, two or more carriers may be at same frequency.

It is desirable for a wireless device to operate across as many frequency bands as possible to improve its compatibility with different operators and geographical areas. The design becomes challenging as the number of frequency bands and combinations for CA increase. A more complicated switching arrangement typically increases insertion loss and reduces apparatus performance. Strict constraints can be placed on the wireless device performance by network operators, and it can be difficult to meet these constraints as the number of bands and band combinations for CA continue to increase. For example, network cell locations are planned according to devices that are not CA capable. When CA capable devices are used, the impact of the insertion loss introduced by the components to allow CA reduces the operational range. Re-planning cell locations to account for the reduced range of CA capable devices would introduce large costs.

US-2012/0327821 A1 discusses systems and methods for different TDD configurations in Carrier Aggregation. Multiple component carriers are used to provide CA and each component carrier has a dedicated antenna. A User Equipment (UE) comprises a first antenna coupled to a first RF transceiver module via a switch and a second antenna coupled to a second RF transceiver module via the switch. Each RF transceiver module processes radio signals for a single component carrier and comprises a SAW filter, a duplexer filter and a filter.

BRIEF DESCRIPTION OF THE DRAWINGS

FIG. 3 is a diagrammatic representation showing more detail of part of the switching arrangement of FIG. 2;

FIG. 3A shows a simplified representation of FIG. 3;

FIG. 6 is a diagrammatic representation showing one way in which the detailed part of the switching arrangement of FIG. 3 can be extended to work with more frequency bands;

The same reference number is used to indicate the same part throughout the drawings.

DETAILED DESCRIPTION

Figure 1:
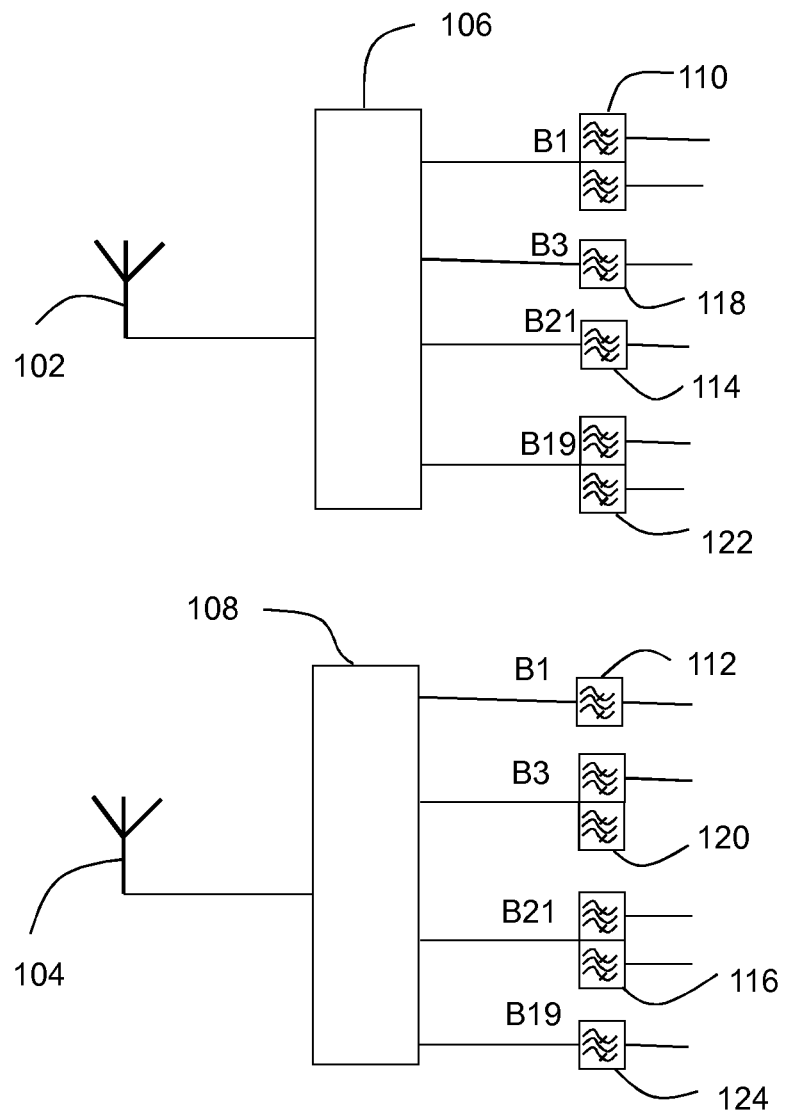
FIG. 1 is a diagrammatic representation of a first embodiment of the invention.

"Wireless devices" include in general any device capable of connecting wirelessly to a network, and includes in particular mobile devices including mobile or cell phones (including so-called "smart phones"), personal digital assistants, pagers, tablet and laptop computers, wearable communication devices, content-consumption or generation devices (for music and/or video for example), data cards, USB dongles, vehicles (for example connected cars), devices with wireless communication capability to communication counterpart etc., as well as fixed or more static devices, such as personal computers, game consoles, consumer electronics, public safety devices and other generally static entertainment devices, various other domestic and non-domestic machines and devices, etc. The term "user equipment" or UE is often used to refer to wireless devices in general, and particularly mobile wireless devices.

The terms "transmitter" and "receiver" are also used herein and are to be construed broadly to include the whole of a device that is transmitting/receiving wireless signals as well as only particular components of a device that are concerned with transmitting/receiving wireless signals or causing or leading to the transmission/reception of wireless signals.

Reference will sometimes be made to "poles", "throws" and "contact points" when discussing switches and switch arrangements. As used herein, a pole is a singular connection point of a switch that can be selectively connected to more than one other connection point. The other connection points that the pole can connect to via the switch are referred to herein as contact points, of which there may be several. A throw as used herein refers to a number of positions between which the switch can change in order to form a connection between the pole and one of the contact points. Thus, for example, a single-pole, double-throw (SPDT) switch will comprise one pole (hence the term "single-pole") and two contact points. The pole can be selectively connected to either of the two contact points. As the switch can be "thrown" into two different positions or configurations in order to form connections with the two contact points, the switch is given the name "double-throw".

Throughout the drawings contact points are depicted as a solid black circle and poles are depicted as circles with a white middle. The connection from the pole to a contact point is depicted by an arrow extending from the pole to the selected contact point. The direction of the arrow is so that the selective nature of the connection from the pole to the contact point is understood. The arrow is always shown pointing away from the pole: it is not indicative of or restrictive on the direction of a signal path. While particular configurations of switches in which the poles are shown connected to certain contact points are depicted, the embodiments are not limited only to the switches being in the configurations depicted, which are provided as examples to assist understanding.

Examples of embodiments of the invention provide at least first and second filtering with respective, different frequency response characteristics for the same frequency band allocation, which are associated with different antennas and which can be in use at the same time.

According to a first embodiment of the present invention, there is provided an RF front end arrangement. The RF front end arrangement comprises:

first filtering for a first frequency band;
second filtering for the first frequency band, the second filtering having a frequency response characteristic that is different from a frequency response characteristic of the first filtering;
third filtering for a second frequency band;
fourth filtering for the second frequency band, the fourth filtering having a frequency response characteristic that is different from a frequency response characteristic of the third filtering; and
a switching arrangement configured to selectively connect the filtering to plural antennas such that at a particular time the first and third filtering is connected to a first antenna and the second and fourth filtering is connected to a second antenna.

In another embodiment of the invention, there is provided a method of sharing a first antenna and a second antenna by at least two bands, the method comprising:

connecting first and second signal paths for a first of the at least two bands at a particular time, wherein the first and second signal paths comprise filtering with respective, different frequency response characteristics; and connecting third and fourth signal paths for a second of the at least two bands at the particular time, wherein the third and fourth signal paths comprise filtering with respective, different frequency response characteristics;

wherein the first and third signal paths share the first antenna and the second and fourth signal paths share the second antenna at the particular time.

Further features and advantages of the invention will become apparent from the following description of preferred embodiments of the invention, given by way of example only, which is made with reference to the accompanying drawings.

In an embodiment each of first and third filtering is duplex filtering and each of second and fourth filtering is simplex filtering. In another embodiment, each of first and fourth filtering is duplex filtering and each of second and third filtering is simplex filtering. The simplex filtering can configured for signals in the reception direction only in some embodiments. The duplex filtering can be frequency division duplex filtering in some embodiments.

In another embodiment, the switching arrangement is configured to selectively connect at least one of: the first filtering alone to the first antenna, the second filtering alone to the second antenna, the third filtering alone to the first antenna, and the fourth filtering alone to the second antenna.

In an embodiment a first frequency division multiplexer can be associated with the first and third filtering; and a second frequency division multiplexer can be associated with the second and fourth filtering.

In an embodiment, the switching arrangement may comprise and antenna switch, a first single pole switch and a second single pole switch. The first single pole switch has: a pole connected, directly or indirectly, to the first filtering; a first contact point connected, directly or indirectly, to the antenna switch; and a second contact point connected, directly or indirectly, to a first filtered terminal of the first frequency division multiplexer. The second single pole switch has: a pole connected, directly or indirectly, to the third filtering; a first contact point connected, directly or indirectly, to the antenna switch, and a second contact point connected, directly or indirectly, to a second filtered terminal of the first frequency division multiplexer.

In another embodiment the switching arrangement comprises a second antenna switch, a third single pole switch and a fourth single pole switch. The third single pole switch has: a pole connected, directly or indirectly, to the second filtering; a first contact point connected, directly or indirectly, to the second antenna switch; and a second contact point connected, directly or indirectly, to a first filtered terminal of the second frequency division multiplexer. The fourth single pole switch has: a pole connected, directly or indirectly, to the fourth filtering; a first contact point connected, directly or indirectly, to the second antenna switch; and a second contact point connected, directly or indirectly to a second filtered terminal of the second frequency division multiplexer.

In an embodiment the switching arrangement can comprise a first portion for selective connection of the first and third filtering to the first antenna and a second portion for selective connection of the second and fourth filtering to the second antenna; and wherein the first portion is separate from the second portion.

In an embodiment the RF front end arrangement can comprise:

fifth filtering for a third frequency band;
sixth filtering for the third frequency band, the sixth filtering having a frequency response characteristic that is different from a frequency response characteristic of the fifth filtering;
seventh filtering for a fourth frequency band; and
eighth filtering for the fourth frequency band, the eighth filtering having a frequency response characteristic that is different from a frequency response characteristic of the seventh filtering;
wherein the switching arrangement is configured to selectively connect the filtering to plural antennas such that at a particular time the fifth and seventh filtering is connected to the first antenna and the sixth and eighth filtering is connected to the second antenna.

In another embodiment a mobile apparatus comprises an RF front end arrangement as discussed above; a first antenna connected to the RF front end arrangement; and a second antenna connected to the RF front end arrangement.

As the 3GPP releases progress further bands, and combinations of bands, are defined. Table 1 below gives details of the twenty-nine bands that can be used for Frequency Division Duplexing (FDD) as of 3GPP release 11.

TABLE 1

3 GPP FDD Frequency Bands as at Release 11

| Band | Uplink Frequency Range (MHz) | Downlink Frequency Range (MHz) |
| --- | --- | --- |
| 1 | 1920-1980 | 2110-2170 |
| 2 | 1850-1910 | 1930-1990 |
| 3 | 1710-1785 | 1805-1880 |
| 4 | 1710-1755 | 2110-2155 |
| 5 | 824-849 | 869-894 |
| 6 | 830-840 | 865-875 |
| 7 | 2500-2570 | 2620-2690 |
| 8 | 880-915 | 925-960 |
| 9 | 1749.9-1784.9 | 1844.9-1879.9 |
| 10 | 1710-1770 | 2110-2170 |
| 11 | 1427.9-1447.9 | 1475.9-1495.9 |
| 12 | 698-716 | 728-746 |
| 13 | 777-787 | 746-756 |
| 14 | 788-798 | 758-768 |
| 15 | 1900-1920 | 2600-2620 |
| 16 | 2010-2025 | 2585-2600 |
| 17 | 704-716 | 734-746 |
| 18 | 815-830 | 860-875 |
| 19 | 830-845 | 875-890 |
| 20 | 832-862 | 791-821 |
| 21 | 1447.9-1462.9 | 1495.9-1510.9 |
| 22 | 3410-3490 | 3510-3590 |
| 23 | 2000-2020 | 2180-2200 |
| 24 | 1626.5-1660.5 | 1525-1559 |
| 25 | 1850-1915 | 1930-1995 |
| 26 | 814-849 | 859-894 |
| 27 | 807-824 | 852-869 |
| 28 | 703-748 | 758-803 |
| 29 | N/a Downlink only for use in carrier aggregation with other bands | 717-728 |

It can be seen from table 1 that each band generally requires band specific filtering because the frequencies, channel widths and uplink/downlink distance are different for each band. In addition, it is proposed to combine two, three or more bands in carrier aggregation. Carrier Aggregation can take place between bands (so called "inter-band") and within a band (so called "intra-band"). In 3GPP release 11 the following inter-band FDD carrier aggregation pairs are defined: B3/B7, B4/B17, B4/B13, B4/B12, B20/B7, B2/B17, B4/B5, B5/B12, B5/B17, B20/B3, B20/B8, B3/B5, B1/B7 and B4/B7. With each release, further bands and band combinations are defined. For example, 3GPP release 12 currently proposes a further three FDD bands and another eight inter-band CA combinations. More are expected to be introduced in later releases. It is challenging to design a front end which can operate on many frequency bands and band combinations. Each component introduced into the signal path also introduces an insertion loss and matching loss which will reduce the performance of the device. As the number of bands and band combinations increases the design of the front end becomes more and more challenging.

The insertion loss associated with band-specific filtering may also be of significance. For example, the design of a duplex filter with minimal insertion loss can be challenging. While the insertion loss introduced by the band-specific filtering may be acceptable when a band is used in isolation, the combination of this insertion loss with additional insertion losses from components to allow an antenna to be shared by more than one component carrier for CA may be undesirable.

FIG. 1 is a simplified diagrammatic representation of an RF front end arrangement according to an embodiment of the invention. The front end arrangement is configured to allow combinations of four frequency band allocations. However, the invention is not limited to combinations of four frequency band allocations and other embodiments may have fewer or more frequency band allocations.

A first antenna 102 and a second antenna 104 are both connected to a switching arrangement. The switching arrangement comprises a first portion 106, which is connected to the first antenna 102, and a second portion 108, which is separate from the first portion 106 and connected to the second antenna 104. In other embodiments the switching arrangement can comprise a single portion.

Each of the first portion 106 and the second portion 108 of the switching arrangement is connected to respective band specific filtering for four frequency band allocations, 3GPP bands 1, 3, 19 and 21. Other embodiments can use other combinations of 3GPP bands depending on application needs, for example frequencies in use by network operators in particular geographic areas. The switching arrangement is configured for selective connection of the band specific filtering so that two of the band specific filtering can be connected a single antenna at the same time to allow the single antenna to be shared by two frequency bands. Thus, in the embodiment of FIG. 1, up to four band specific filtering can be in use at the same time; two connected to the first antenna 102 and two connected to the second antenna 104. This allows simultaneous use of different Radio Access Technologies, CA, multi carrier HSPA, MIMO or UL MIMO for example.

First filtering 110 for a first frequency band (3GPP band 1 in this embodiment) is connected to the switching arrangement for selective connection to the first antenna 102. Second filtering 112 for the first frequency band is connected to the switching arrangement for selective connection to the second antenna 104. The second filtering 112 has a different frequency response characteristic from the first filtering 110. More specifically, in this example, the first filtering 110 is a duplex filter allowing both transmission and reception of signals through the first antenna 102 and the second filtering is a simplex filter allowing only the reception of signals through the second antenna 104. The first filtering 110 has three terminals: a common terminal for connection to the switching arrangement, a "low" terminal with a pass band of approximately 1920-1980 MHz for transmission signals and a "high" terminal with a pass band of approximately 2110-2170 MHz for reception signals. The second filtering has two terminals: a terminal for connection to the switching arrangement and a terminal with a pass band of approximately 2110-2170 MHZ for reception signals. The reception (RX) filter outputs are fed to a Low Noise Amplifier (LNA) (not shown). The RX filter outputs may be balanced or single ended.

It may be possible to design a simplex filter with lower insertion loss than a duplex filter. As a result, this arrangement of filtering provides a downlink or reception signal path through second filtering 112 which is likely to have a smaller insertion loss than the reception path through first filtering 110. This can be advantageous for 3GPP Band 3 in particular. 3GPP Band 3 has a wide bandwidth and a narrow separation between the transmission and reception frequencies. Designing a duplex filter with these properties is particularly challenging and a Band 3 duplexer can have a relatively high insertion loss as a component itself compared to duplexers for other 3GPP bands.

The first and second filtering can be used simultaneously, creating the possibility for the second filtering 112 to provide either antenna diversity/MIMO in reception or to receive a different signal within the first frequency band than that received by the first filtering 110 (for example, this could allow intra-band CA within the first frequency band).

Similar pairs of filtering with respective, different frequency response characteristics are provided for a second frequency band (3GPP band 21 in this embodiment), a third frequency band (3GPP band 3 in this embodiment) and a fourth frequency band (3GPP band 19 in this embodiment).

More specifically, third filtering 114 for the second frequency band is connected to the switching arrangement for selective connection to the first antenna 102. Fourth 116 filtering for the second frequency band is connected to the switching arrangement for selective connection to the second antenna 104. Referring to FIG. 1, the arrangement of duplex and simplex filtering is reversed for the second frequency band compared to the first frequency band. In other words the third filtering is simplex or reception only and the fourth filtering is duplex. This is chosen so that if the first and second frequency bands are in use simultaneously, each antenna handles transmission signals for a single band. In some embodiments, RX filters may be combined with special purpose filter input and output arrangement as dual filters, triplexers or multi-input multi-output filters for example.

Fifth filtering 118 for the third frequency band is connected to the switching arrangement for selective connection to the first antenna 102. Sixth filtering 120 for the third frequency band is connected to the switching arrangement for selective connection to the second antenna 104. Fifth filtering 118 is simplex, reception only filtering while sixth filtering 120 is duplex filtering.

Seventh filtering 122 for the fourth frequency band is connected to the switching arrangement for selective connection to the first antenna 102 and is duplex filtering. Eighth filtering 124 for the fourth frequency band is connected to the switching arrangement for selective connection to the second antenna 104 and is simplex, reception only filtering.

In further embodiments, additional frequency bands can be provided. For example the switching arrangement might enable band specific filtering for one or more frequency bands to be connected to the first and/or second antenna in isolation. Filtering for these additional frequency bands may be provided for connection to only the first antenna or only the second antenna in some embodiments.

As mentioned above, the switching arrangement is configured to allow simultaneous use of two frequency bands with each of the first and second antennas 102, 104. For example, the switching arrangement allows the combination of 3GPP Bands 3+19, 3+21, 1+21 and 1+19 by connecting appropriate filtering simultaneously. The switching arrangement also allows connection of these bands in isolation if required for a particular operating mode. For example, if operation on a single frequency band is required without CA, the use of the first and second antennas provides a reception path with lower insertion loss through the simplex filtering.

Figure 2:
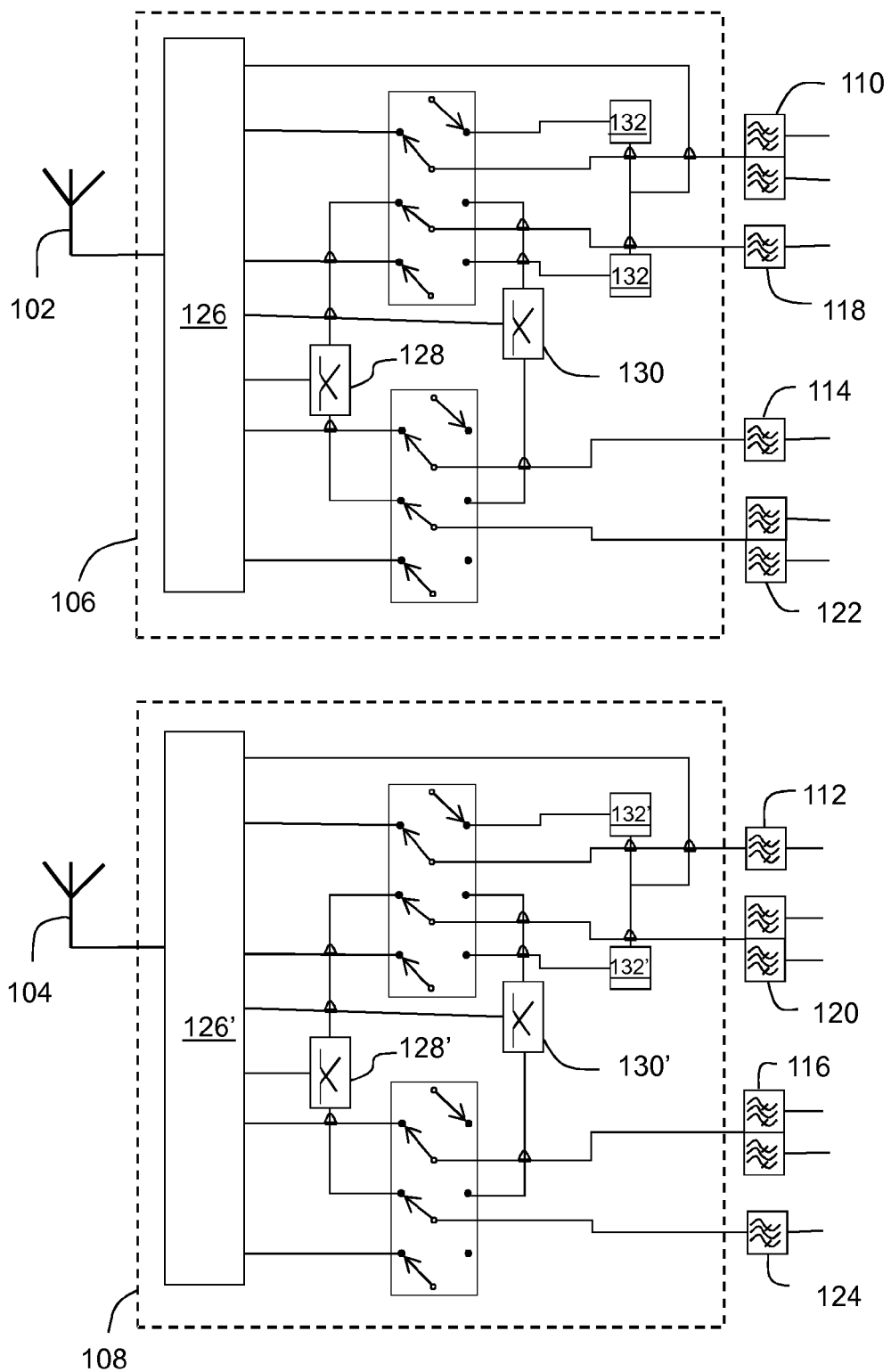
FIG. 2 is a diagrammatic representation of the embodiment of FIG. 1, with more detail of a possible switching arrangement.

An example of one possible construction of the switching arrangement is depicted in diagrammatic form in FIG. 2. The construction of FIG. 2 is the same as FIG. 1, except more detail of the first portion 106 and second portion 108 of the switching arrangement is depicted. The invention is not limited to this construction of switching arrangement; any suitable construction can be used in other embodiments which allow two sets of band specific filtering to share the same antenna simultaneously.

As shown in FIG. 2, the construction of the first portion 106 and second portion 108 of the switching arrangement is the same. Elements of the second portion 108 are denoted by a "primed" reference number. For example the first portion 106 includes an antenna switch module 126 and the second portion 108 includes an antenna switch module 126'. Other embodiments can use a different construction for the first portion 106 than for the second portion 108.

The first antenna 102 is connected to an antenna switch module 126. The antenna switch module is capable of connecting the antenna to any one of the terminals depicted on the right hand side of the antenna switch module. The elements between the antenna switch module 126 and the first, third, fifth and seventh filtering 110, 114, 118, 122 allow any of the first, third, fifth and seventh filtering to be connected to the antenna 102 in isolation or the first+third, first+seventh, fifth+third or fifth+seventh filtering in combination to share the first antenna 102.

Each of the first, third, fifth and seventh filtering is connected to a pole of a respective Single Pole Switch (SPS). In the following description, each SPS will be referred to with the same numbering as the filtering. Thus, first filtering 110 is connected to the pole of a first SPS, third filtering 114 is connected to a pole of a third SPS, fifth filtering 118 is connected to a pole of a fifth SPS and seventh filtering 122 is connected to a pole of a seventh SPS. The second, fourth, sixth and eight SPS are provided in the second portion 108 of the switching arrangement.

Each SPS has a CP which connects directly to the antenna switch module 126. When it is desired to use filtering in isolation, the associated SPS is set to the CP for a direct connection to the antenna switch module and the antenna switch module is controlled to be connected that terminal to the antenna.

In addition each SPS has at least one CP which is connected to the antenna switch through a frequency division multiplexer an example of a frequency selective component. The frequency division multiplexer enables filtering for two different frequency bands to share the antenna simultaneously.

There are three frequency division multiplexers in this embodiment: a first diplexer 128, a second diplexer 130 and matching 132. In other embodiments other frequency selective components can be used, for example, triplexers, quadplexers, etc. The filtering for each of the bands is distributed so that the higher frequency in each combination possible (for example bands 1 and 3 when the combinations are 1+19, 1+21, 3+19 and 3+21 as in this embodiment) is located on a "high" side of the first and second diplexers 128, 130. The corner frequency between the "high" and "low" terminals of the first diplexer 128 is set at 1.5 GHz, allowing the first diplexer 128 to be used for the combination of Bands 1+19 and 3+19. The second diplexer 130 has a corner frequency set at approximately 1.6 GHz, allowing the second diplexer to be used for combinations of Bands 1+21 and 3+21 (Band 21, with a highest frequency of 1510.9 MHz is not suitable for connection to the "low" side of the first diplexer 128). In addition, matching 132 enables band 1+3 to be combined. In other embodiments a diplexer with a corner frequency of approximately 1.9 GHz could be used to allow bands 1 and 3 to be share the antenna.

The first SPS for the first filtering 110 therefore has a CP for connection to the "high" terminal of diplexer 128, another CP for connection to the "high" terminal of diplexer 130 and another CP for connection to a terminal of the matching 132. The fifth SPS for the fifth filtering 118 also has a CP for connection to "high" terminal of diplexer 128, which is shared with or common to the CP of the first SPS, another CP for connection to the "high" terminal of diplexer 130, which is shared with or common to a terminal of the first SPS, and another CP for connection to a terminal of the matching 132.

On the "low" side the third SPS for the third filtering 114 and the seventh SPS for seventh filtering 122 have two CPs which are shared with or common to both the third SPS and the seventh SPS. One is connected to the "low" terminal of diplexer 128 and the other is connected to the "low" terminal of diplexer 130.

This arrangement allows the frequency division multiplexers to be in the signal path only when required, so any additional insertion loss associated with them is incurred only when two bands are required to share the same antenna.

FIG. 3 is a diagrammatic representation showing the arrangement of SPS switches used for first and fifth, third and seventh, second and sixth, and fourth and eighth filtering in FIG. 2; FIG. 3A depicts the simplified representation used to illustrate this in FIG. 2. It can be seen that not all the possible connections of FIG. 3 are used in the embodiment of FIG. 2, any unused connections can be omitted in other embodiments.

The arrangement of FIG. 3 comprises two Single Pole Switches (SPS) 2, 4 each of which has a single pole and a plurality of Contact Points (CP). As depicted there are four CPs provided for each SPS, although other embodiments may have fewer or more CPs. The following description links the possible connections to the first filtering 110 and fifth filtering 118, diplexers 128, 130 and matching 132 of FIG. 2.

The numbers used to name the SPS and filtering in the follow description refer to the switching of the top most band specific filtering in FIG. 2, which is for the first and fifth filtering. The pole 6 of a first SPS 2 is for connection to first filtering 110 for the first frequency band. The pole 8 of a fifth SPS 4 is for connection to fifth filtering 118 of a third frequency band. A first CP 10 of the first SPS 2 is provided for connection to an antenna switch. A first CP 12 of the fifth SPS 4 is provided for connection to an antenna switch. A second CP 14 of the first SPS 2 is connected to a second CP 16 of the fifth SPS 4. In some embodiments, a common CP may be provided which is shared by both the first SPS 2 and the fifth SPS 4. The connection between the second CP 14 of the first SPS 2 and the second CP 16 of the fifth SPS provides a common or shared connection to which a frequency selective component, such as the first frequency division multiplexer 128, can be connected. Therefore, the switch arrangement as described so far allows a first and second band to be selectively connected directly to an antenna switch or to a frequency selective component. The frequency selective component need only be in the signal path when required. In some embodiments the frequency selective component is not connected directly to the switch arrangement; for example other components may be present between the frequency selective component and the switching arrangement.

The switching arrangement allows a wide variety of different connections between components to be achieved. Connected to other components as described above, in use, this construction allows all signal paths to bypass a frequency selective component when it is not required, thus reducing insertion loss. A further benefit is that this construction allows the band specific filtering connected to the poles 6, 8 to share a single frequency selective component.

It can be the case that the frequency selective component is designed with a pass band allowing two or more frequency bands to use the same filtered connection when their frequencies are in the pass band, as described above.

Further features depicted in FIG. 3 will now be described. One or more of these further features may be omitted in further embodiments, for example if not required for a particular application or combination of bands.

The first SPS 2 and the fifth SPS 4 can each have a third CP 18, 20. The third CP 18 of the first SPS 2 and the third CP 20 of the fifth SPS 4 are connected together. In other embodiments the third CPs 18, 20 may be provided by a shared or common CP. This provides another common or shared connection to which a second frequency selective component, such as the second frequency division multiplexer 130, can be connected. This allows each of the first and second bands to be connected to another frequency selective component. A different frequency selective component with different frequency cut off characteristics might be needed to allow for operation in a different geographical region or with a different network operator where different combinations of bands can be used in carrier aggregation, as was the case above to allow combinations with 3GPP band 21.

In an embodiment a frequency selective component can have an adjustable corner frequency (for example in the case of a diplexer) or corner frequencies (for example in the case of a triplexer or quadplexer). In this way the frequency response of the frequency selective component can be altered according to aggregated radio use cases or two or more RATs. An adjustable frequency selective component may support two or more different frequency selective component radio use cases.

In an embodiment the connection between the second CP 14 of the first SPS 2 and the second CP 16 of the fifth SPS 4 provides a common or shared connection to which a frequency selective component, such as an antenna frequency division multiplexer, can be connected. This may be a high pass port of a diplexer for example. A low pass port may be connected to another switching arrangement in the same way.

The first SPS 2 can also have a further CP 22 to which a frequency selective component specific to the band connected to the pole 6 of the first SPS can be connected. Likewise, the fifth SPS 4 can also have a further CP 24 to which a frequency selective component specific to the band connected to the pole 8 of the fifth SPS can be connected. The frequency selective component or components can be connected between the further CP 22, 24 and an antenna switch, if an output is available. Frequency selective components include for example matching components or networks and frequency division multiplexers. These may be implemented inside and/or outside a package containing the switching arrangement, for example by one or more discrete components, integrated components, or designed structures integrated with the switching arrangement in a single module as 2D or 3D components.

In some embodiments, when both the first SPS 2 and the fifth SPS 4 have a further CP 22, 24, these can be connected to ends of the matching network 132 connected to the antenna switch, where the matching network 132 is configured to allow frequency bands close to each other in frequency to share a single antenna in carrier aggregation modes. In this configuration the matching network will function similar to a frequency division multiplexer but the first and second bands are connected to different terminals rather than a shared one as would be case if the common or shared connection provided by the second CPs 14, 16 or third CPs 18, 20 was used.

In other embodiments, when both the first SPS 2 and the fifth SPS 4 have a further CP 22, 24, these can be connected to respective terminals of a frequency division multiplexer. For example a different frequency selective component with different frequency cut off characteristics might be needed for some band combinations in carrier aggregation or when two or more Radio Access Technologies (RAT) are used. To give one example, 3GPP Band 7 has a lowest frequency of 2500 MHz and 3GPP Band 3 has a highest frequency of 1880 MHz. Either band 3 or band 7 could be combined with 3GPP Band 8, which has a highest frequency of 960 MHz, by connecting them to the "high" connection of a diplexer designed to have a low/high cut off frequency of 1.5 GHz via a common shared CP, such as the CPs 14, 16. However, such a diplexer is not acceptable if 3GPP Bands 3 and 7 are to be combined. This construction allows a diplexer for multiplexing bands 3 and 7, for example having a high/low cut off frequency of 2.2 GHz, to be connected to the further CPs 22, 24.

A first matching switch 26 can be provided for use with the first SPS 2. The first matching switch 26 has a single pole 28 for connection to one end of a matching network, a first CP 30 and a second CP 32. The first CP 30 is connected to the further CP 22 of the first SPS 2 for connection to another end of the matching network. The second CP 32 of the first matching switch 26 is connected to the antenna switch. It can also be connected to the first CP 10 of the first SPS. In other embodiments the first CP 30 of the first matching switching switch 26 can be common to or shared with the further CP 22 of the first SPS 2. Likewise, the second CP 32 of the first matching switch 26 can be common to or shared with the first CP 10 of the first SPS 2. With this configuration a matching network connected between the pole 28 and the first CP 30 of the first matching switch 26 can be connected in signal path of the first frequency band by setting the first matching switch 26 to the second CP 32 and the first SPS 2 to the further CP 22.

A second matching switch 34 can be provided for use with the fifth SPS 4. The construction and connection of the second matching switch 34 corresponds to the first matching switch 26, but with respect to the fifth SPS 4. Thus, the second matching switch 34 has a single pole 36 for connection to one end of a matching network, a first CP 38 and a second CP 40. The first CP 38 is connected to the further CP 24 of the fifth SPS 4 for connection to another end of the matching network. The second CP 40 of the second matching switch 34 is connected to the antenna switch. It can also be connected to the first CP 12 of the fifth SPS 4. In other embodiments the first CP 38 of the second matching switching switch 34 can be common to or shared with the further CP 24 of the fifth SPS 4. Likewise, the second CP 40 of the second matching switch 34 can be common to or shared with the first CP 12 of the fifth SPS 4.

The switches forming the switch arrangement of FIG. 3 can be of any suitable form, for example a solid state or an electromechanical switch. As discussed above, some elements of the switch arrangement of FIG. 1 can be omitted in embodiments where they are not required. Alternatively, the switch arrangement may be configurable to program any unused CPs and/or Poles into a high impedance state. This can simplify inventory management during manufacture by providing a single switching arrangement that can be used in many different configurations for different combinations of frequency bands.

Figure 4:
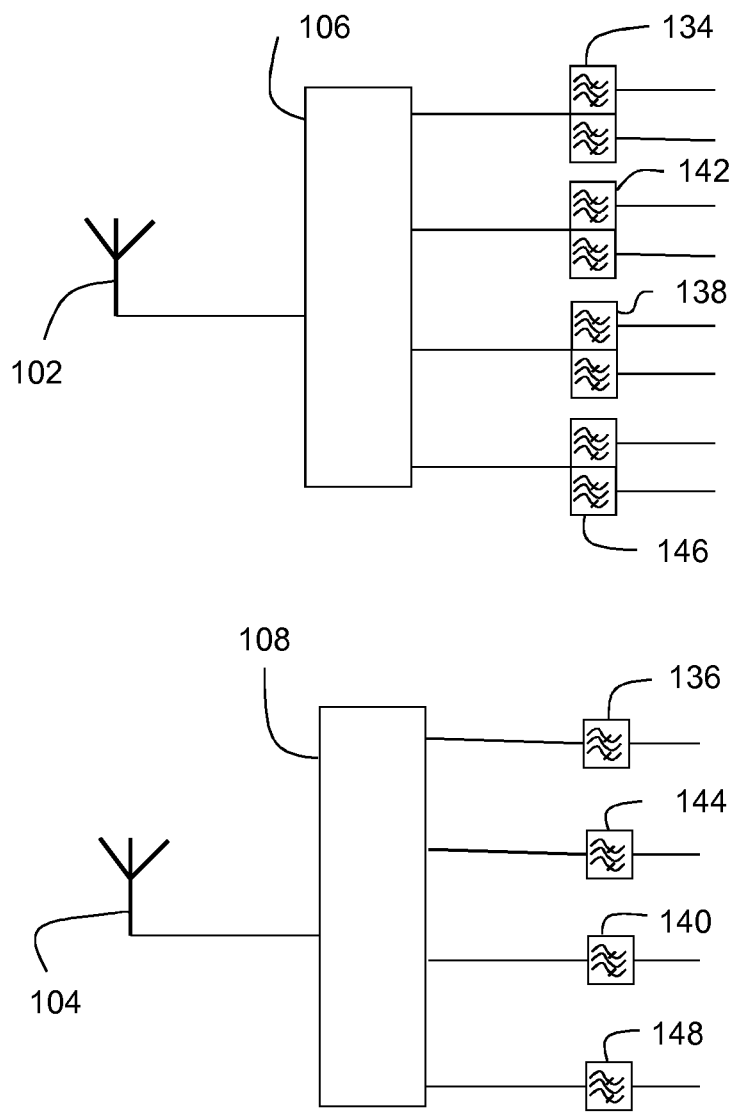
FIG. 4 is a diagrammatic representation of another embodiment of the invention.

FIG. 4 depicts another embodiment; the construction of the embodiment of FIG. 4 is the same as that of FIG. 1, except as described below. In this embodiment the first antenna 102 is used for transmission and reception, while the second antenna 104 is used only for reception. Thus, the filtering is arranged so that duplex filtering is provided for signal paths from the first antenna and simplex, reception only, filtering is provided for signal paths from the second antenna.

More specifically, first filtering 134 and second filtering 136 for the first frequency band (3GPP Band 1 in this embodiment) are duplex and simplex filtering, respectively. Likewise the pairs of filtering for other bands comprise duplex filtering for connection to the first antenna 102 and simplex, reception only, filtering for connection to the second antenna 104. Third filtering 138 and fourth filtering 140 for the second frequency band (3GPP Band 21 in this embodiment) are duplex and simplex filtering, respectively. Fifth filtering 142 and sixth filtering 144 for the third frequency band (3GPP Band 3 in this embodiment) are duplex and simplex filtering, respectively. Seventh filtering 146 and eighth filtering 148 for the fourth frequency band (3GPP Band 19 in this embodiment) are duplex and simplex filtering, respectively.

The first and second portions 106, 108 of the switching arrangement can have the same construction as discussed above for the embodiment of FIG. 1, with reference to FIGS. 2 and 3. Alternative constructions of switching arrangement can also be used in other embodiments.

In other embodiments, the simplex filtering discussed above can be transmission only. This could reduce the insertion loss of the transmission path with the potential to reduce device power consumption for the transmission of signals.

In further embodiments, the simplex filtering could be transmission only for some bands and reception only for others. The decision of whether to provide reduced insertion loss on the reception or transmission path could depend on the particular use case for a device incorporating the RF front end arrangement and number of antenna interfaces.

Figure 5:
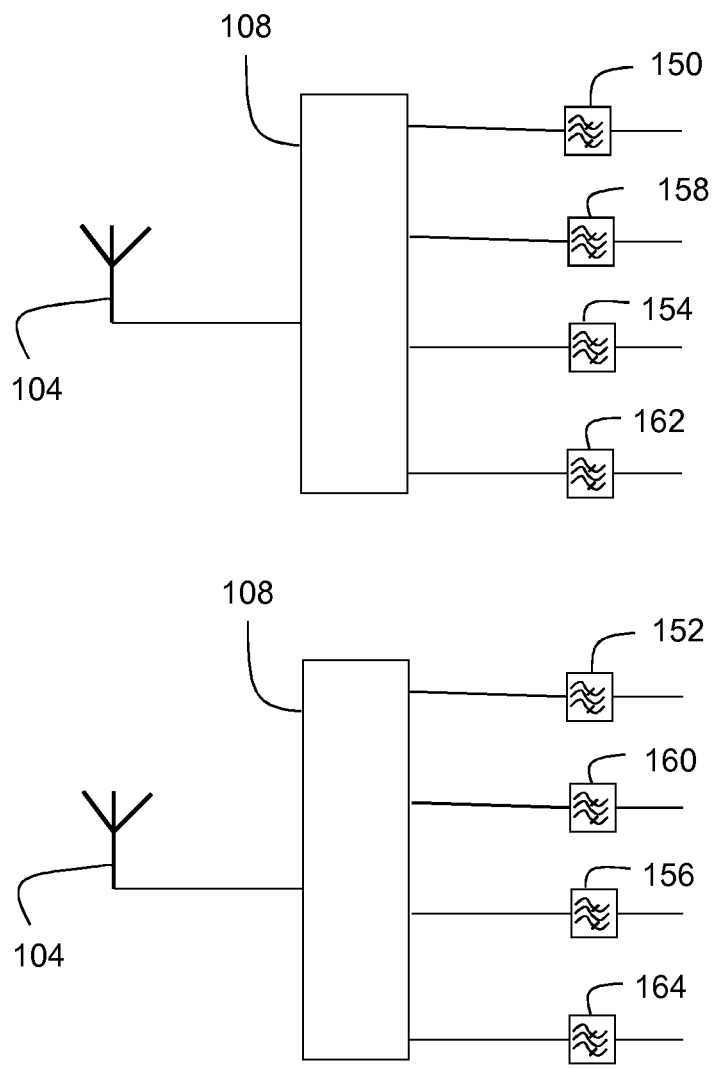
FIG. 5 is a diagrammatic representation of another embodiment of the invention.

Another embodiment, depicted in FIG. 5, distributes simplex, reception only filtering and simplex, transmission only filtering across the two antennas. This allows reduced insertion losses in both the transmission and reception paths. Although the number of signal paths that can be in use simultaneously is reduced, this embodiment still allows two transmission and two reception signal paths to be in use simultaneously and more may be added by selecting a switch component with a larger amount of nodes, or which can connect two or more of its nodes to an antenna simultaneously.

The construction of the embodiment of FIG. 5 is the same as that of FIG. 1 above, except as described below. In this embodiment the first antenna 102 is used for transmission only and the second antenna 104 is used for reception only. Thus, the first filtering 150 for the first frequency band is simplex, transmission only, filtering and the second filtering 152 for the first frequency band is simplex, reception only, filtering. Third filtering 154 and fourth filtering 156 for the second frequency band is simplex, transmission only, and simplex, reception only, respectively. Fifth filtering 158 and sixth filtering 160 for the third frequency band is simplex, transmission only and simplex, reception only, respectively. Seventh filtering 162 and eighth filtering 164 for the fourth frequency band is simplex, transmission only and simplex, reception only, respectively.

In other embodiments, the transmission and reception simplex filtering of FIG. 5 can be distributed across the antennas so that each antenna is used for transmission of some frequency bands and reception of others. For example, the transmission and reception filtering could be arranged in the same way as FIG. 1, with the duplex filtering of FIG. 1 replaced by simplex, transmission only, filtering.

In other embodiments further antennas and respective front end arrangements can be provided to allow the use of CA, MIMO or diversity in uplink and/or downlink.

Many other arrangements of band specific filtering and construction of the switching arrangement are possible within the scope of the invention. For example, FIG. 6 depicts how the principles of using single pole switches described above with reference to FIG. 3 can be extended to allow connection of a further set of band specific filtering. The construction of FIG. 6 allows three frequency bands to be selectively connected to, or bypass, at least one frequency selective component, such as a frequency division multiplexer. The construction of the example of FIG. 6 is the same as the example of FIG. 3, except as described below. The features described above which can be omitted for FIG. 3 which are also depicted as present in the example of FIG. 6 can be omitted in some embodiments.

An additional SPS 42 is provided which has a pole 44 for connection to filtering for a third frequency band allocation and a first CP 46 for connection to an antenna switch. A second CP 48 is connected to or shared with the second CP 16 of the fifth SPS 4. Thus, in this configuration an additional frequency band can be selectively connected to a frequency selective component via the second CP 48 or bypass the frequency selective component via the first CP 46. The first CP 46 can be connected to or shared with the first CP 12 of the fifth SPS 4.

Additional features associated with the third SPS 42 and depicted in FIG. 6 will now be described. These additional features can be omitted in some examples.

The additional SPS 42 can be provided with a further CP 50 for connection to matching components. An additional matching switch 52 can also be provided for the additional SPS 42 allowing a matching network to be selectively switched in the signal path of the additional band. The additional matching switch 52 is a single pole double throw switch with a pole 54 for connection to one end of a matching network, a first contact point 56 for connection to an antenna switch and a second CP 58 for connection to another end of the matching network. The second CP 58 of the additional matching switch 52 can be connected to or shared with the further CP 50 of the additional SPS 42.

As depicted in FIG. 6, although the additional SPS 42 has a third CP 60 it is not connected to the third CPs 18, 20 of the first and fifth SPSs 2,4. This allows a simple topography for the connections between the devices in the switch arrangement. In other embodiments, for example using layered connections or another connection method, the third CP 60 of the additional SPS 42 can be connected to the third CPs 18,20 of the first and fifth SPSs.

The above embodiments are to be understood as illustrative examples of the invention. Further embodiments of the invention are envisaged. For example, further configurations of frequency bands and frequency band combinations (not limited to those defined by 3GPP) can be used together with different frequency selective components in the switching arrangement. As an example, possible alternative configurations of filtering for frequency bands and frequency selective components are set out below and depicted in diagrammatic form in FIGS. 7 to 14. In these figures, the switching arrangement for a single antenna is depicted for clarity, a similar or identical switching arrangement can be used for other antennas with band specific filtering having different frequency response characteristics. FIGS. 7 to 14 also indicate how additional filtering can be provided connected directly to an antenna switch for bands which will be required for in isolation only with an antenna. Each of FIGS. 7 to 14 shows signal paths for a single combination of 3GPP bands in bold, however, the arrangements are not limited to this single combination.

Figure 7:
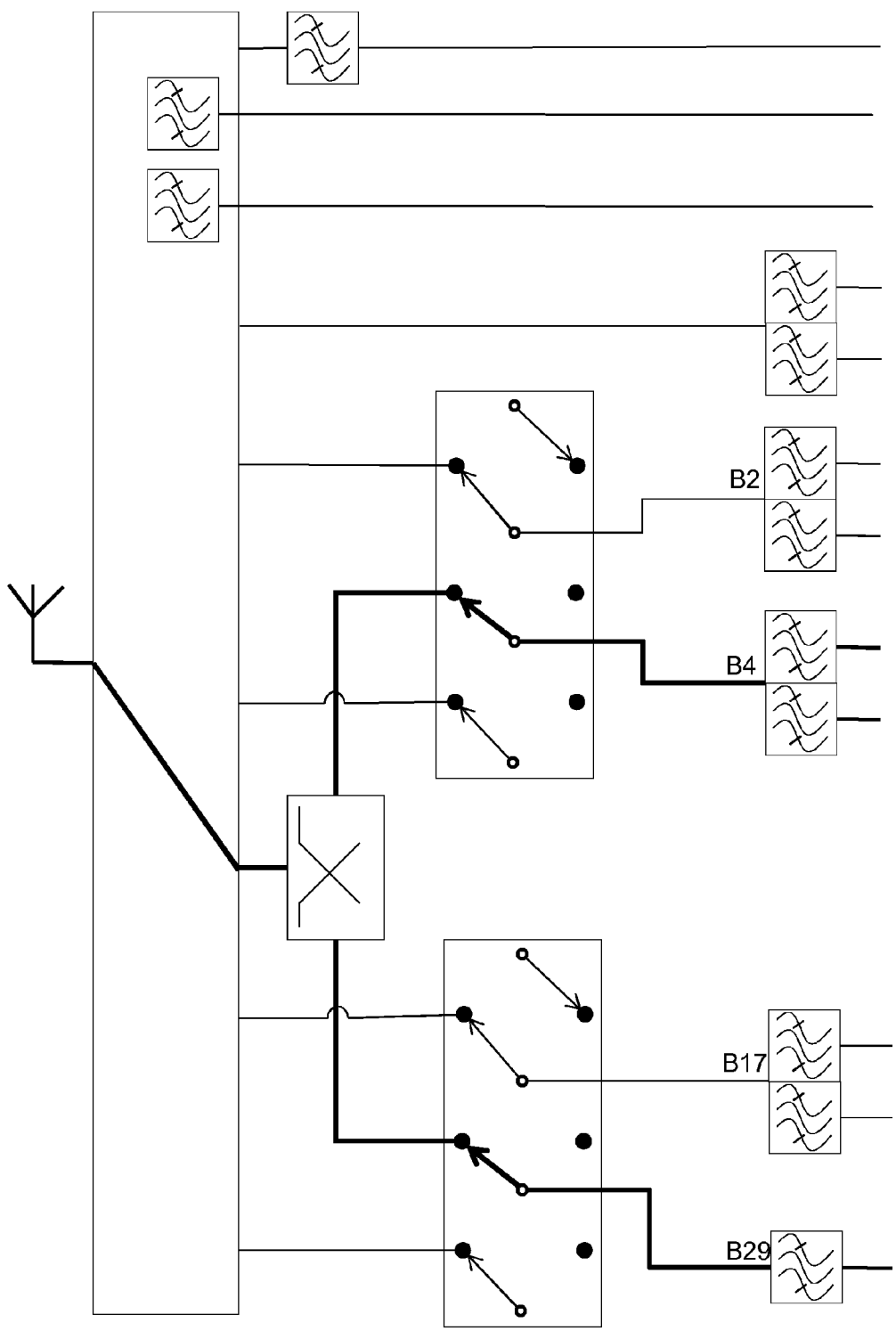
FIGS. 7 to 15 show schematically examples of alternative switching arrangements that can be used with the invention.

FIG. 7 depicts an example arrangement in which 3GPP Bands 2, 4, 17 and 29 can be combined, with bands 2 and 4 selectively connected to the "high" side of a diplexer and bands 17 and 29 selectively connected to the "low" side of the diplexer to allow combinations of bands 2+17, 2+29, 4+17 and 4+29. Because Band 29 is used for reception only, filtering for Band 29 could be associated with only one antenna in some embodiments.

Figure 8:
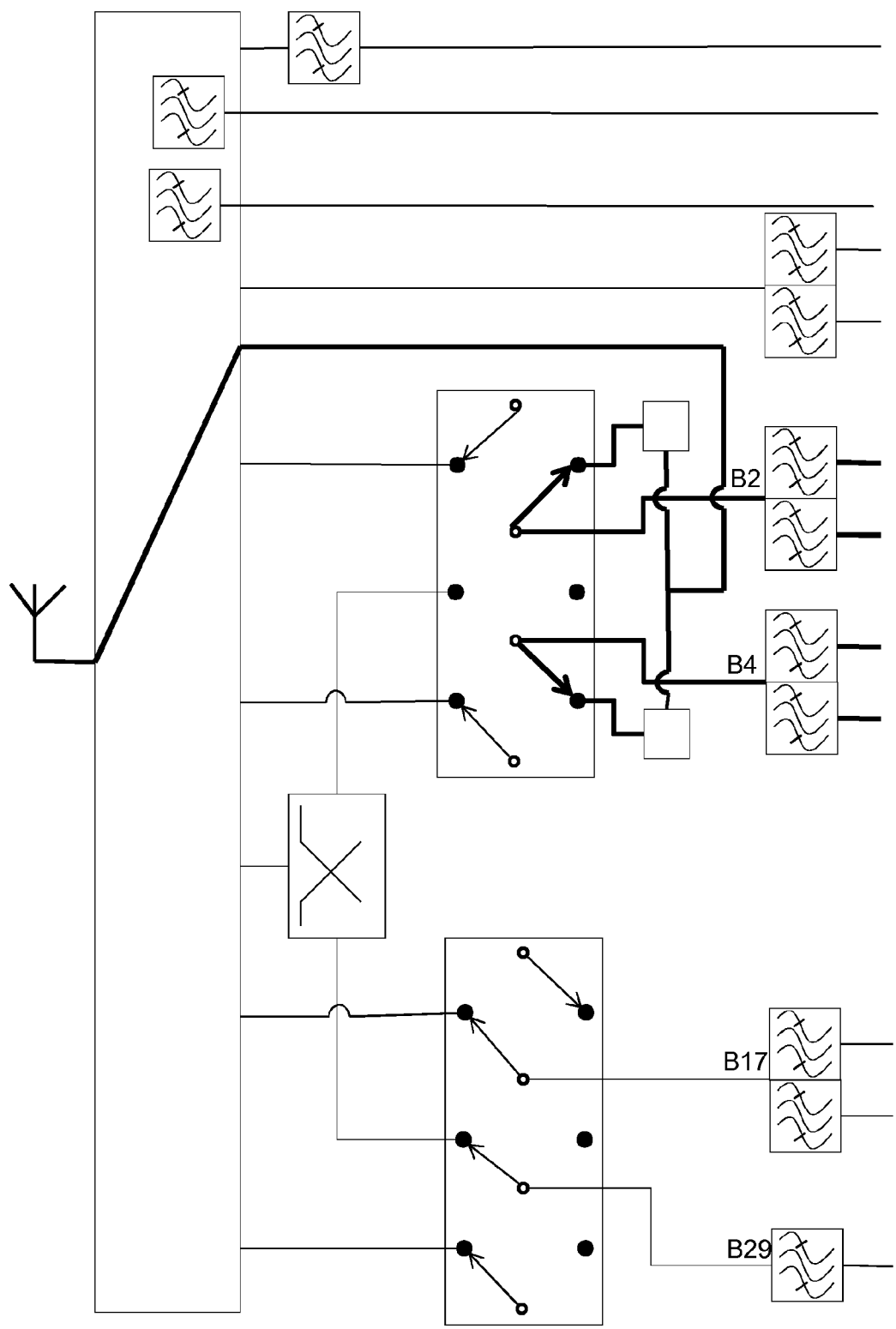

FIG. 8 depicts an example arrangement in which 3GPP Bands 2, 4, 17 and 29 can be combined as discussed with reference to FIG. 7 above, further including matching so that Bands 2 and 4 can be combined.

Figure 9:
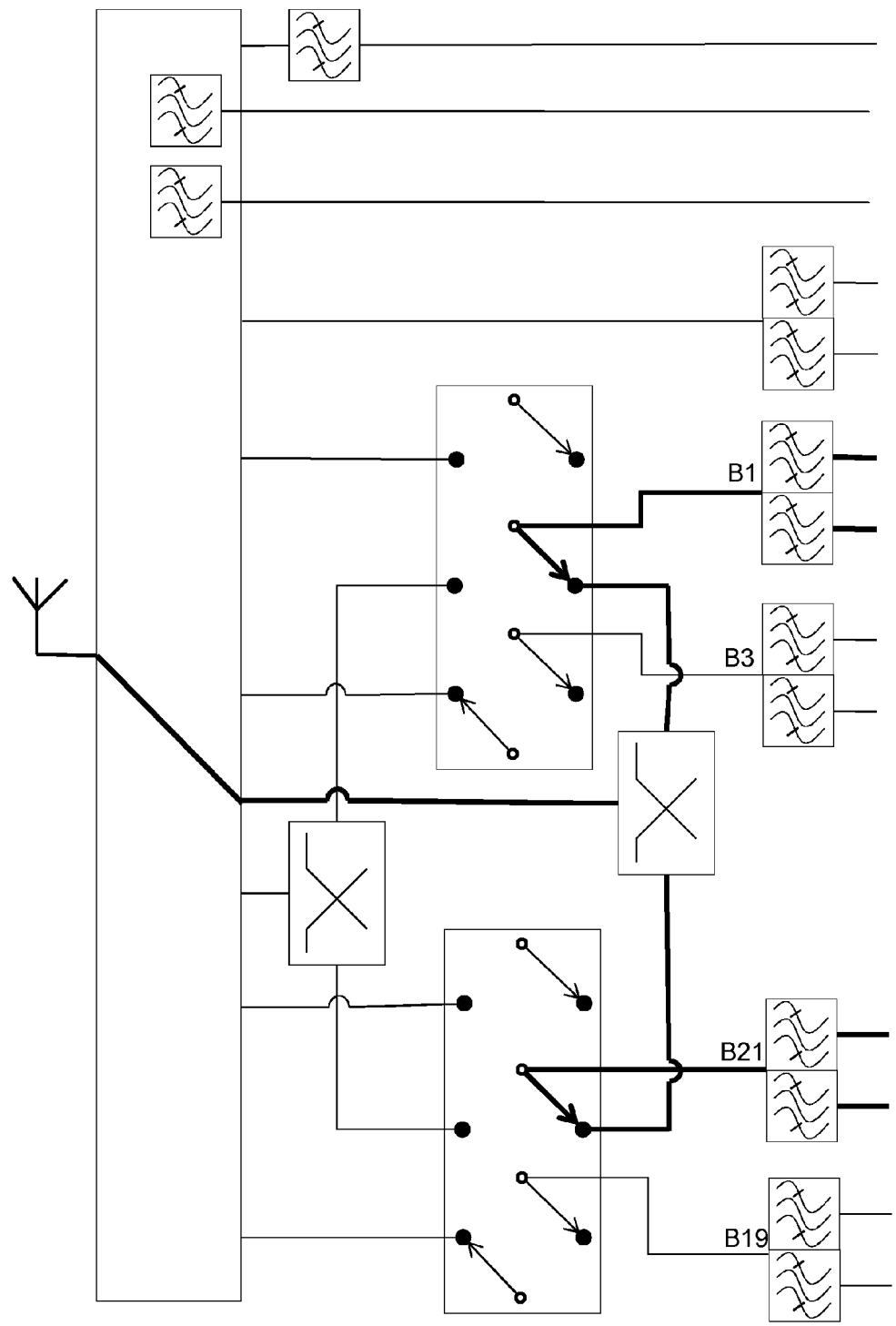

FIG. 9 depicts an example arrangement in which 3GPP Bands 1, 3, 19 and 21 can be combined as discussed above in FIG. 2, however, the matching 132 is omitted so that bands 1 and 3 cannot be combined.

Figure 10:
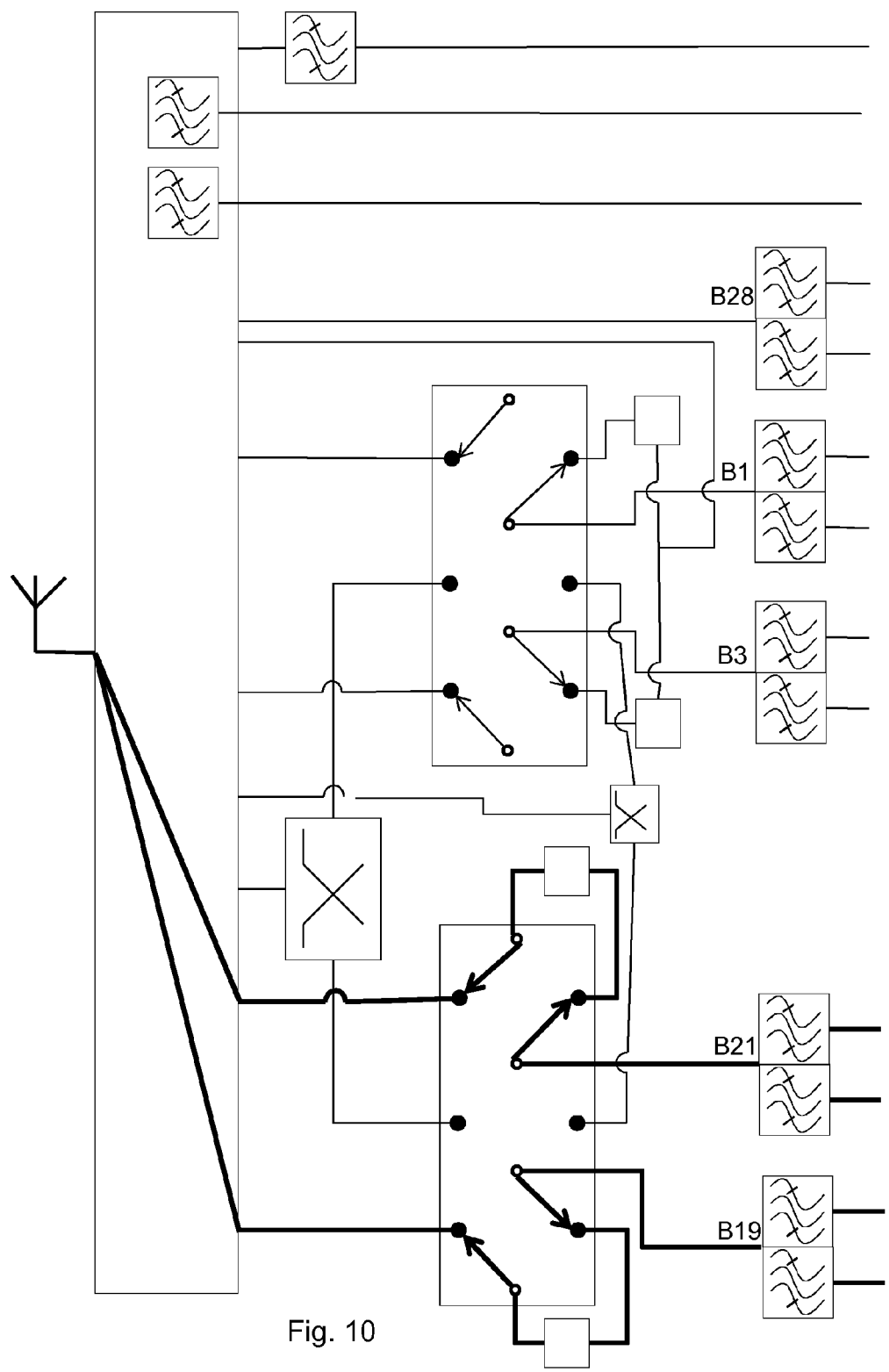

FIG. 10 depicts an example arrangement using an antenna switch which can connect a single antenna to two signal paths for use at the same time. This can allow further flexibility of the switching arrangement.

Figure 11:
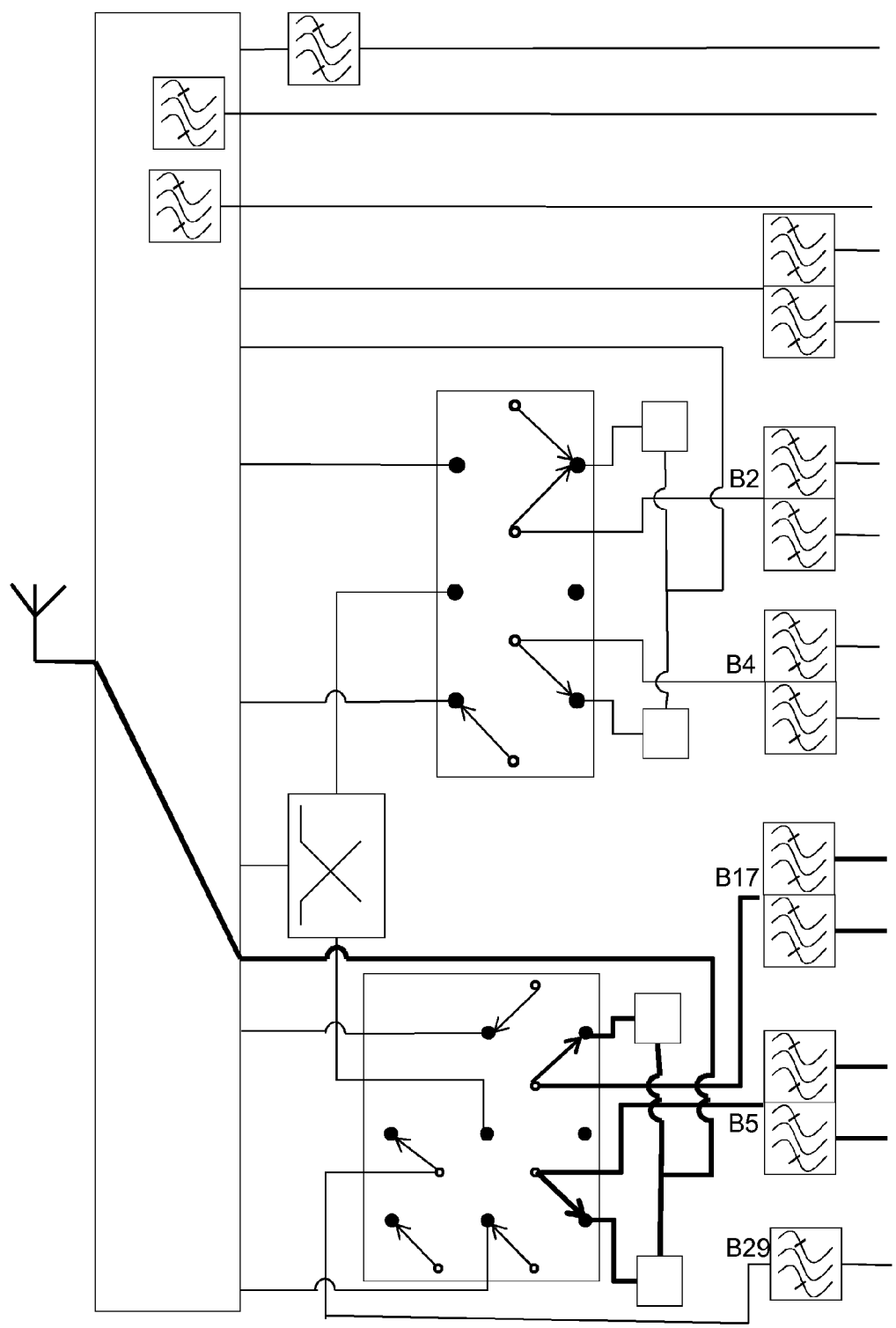

FIG. 11 depicts an arrangement in which 3GPP Bands 2, 4, 5, 17 and 29 can be combined. Bands 2 and 4 are selectively connected to a "high" side of a diplexer (e.g. using the arrangement of FIG. 3) and bands 5, 17 and 29 are connected on the "low" side of a diplexer (for example using the arrangement of FIG. 6).

Figure 12:
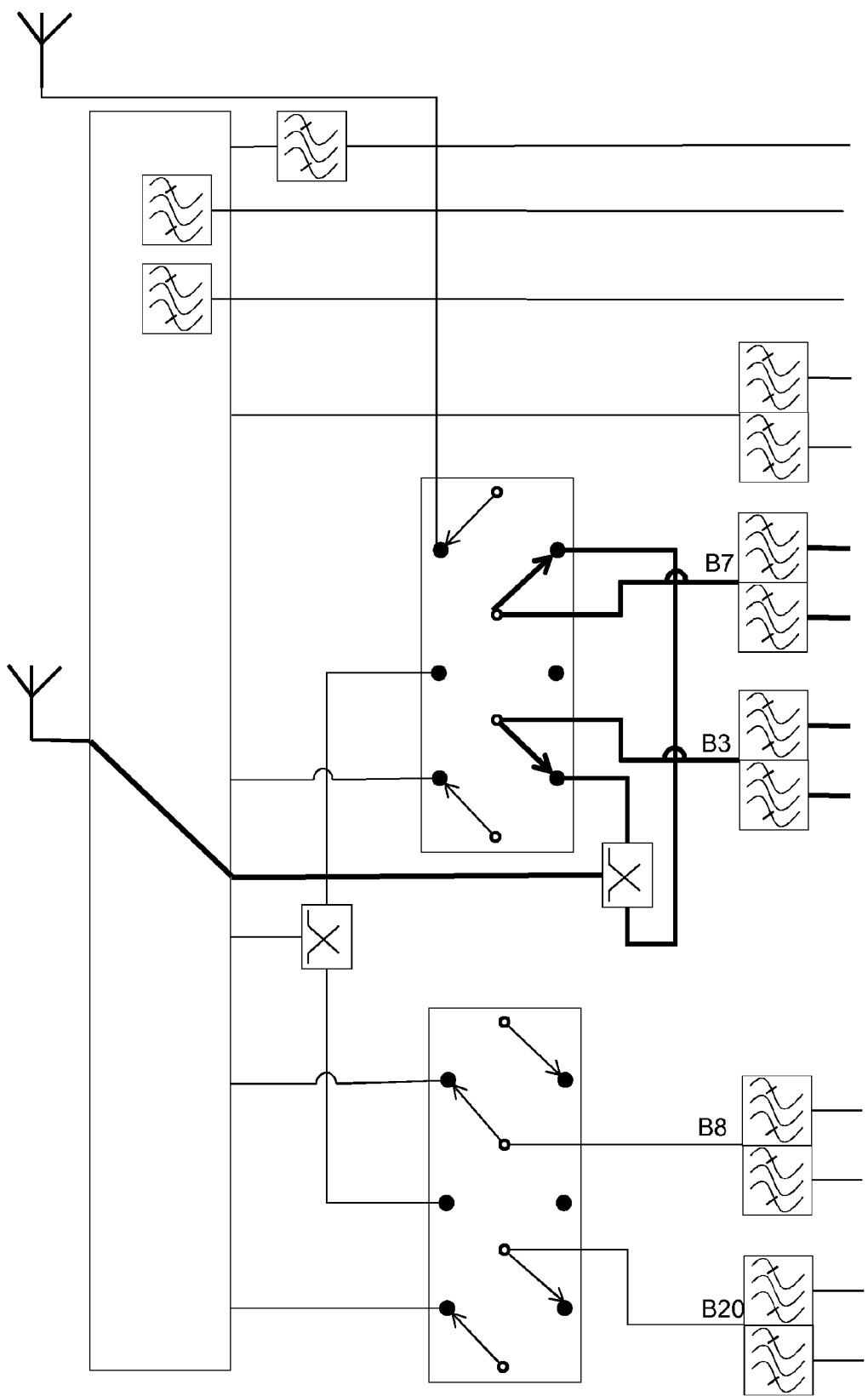

FIG. 12 depicts an arrangement in which 3GPP Bands 3, 7, 8 and 20 can be combined. Bands 3 and 7 are selectively connected to a "high" side of a diplexer and bands 8 and 20 are selectively connected to a "low" side of the diplexer. A further diplexer is provided for selective connection of bands 3 and 7 at the same time. Optionally a further, dedicated Band 7 antenna may be provided (in this case there would be at least four antennas in the final construction).

Figure 13:
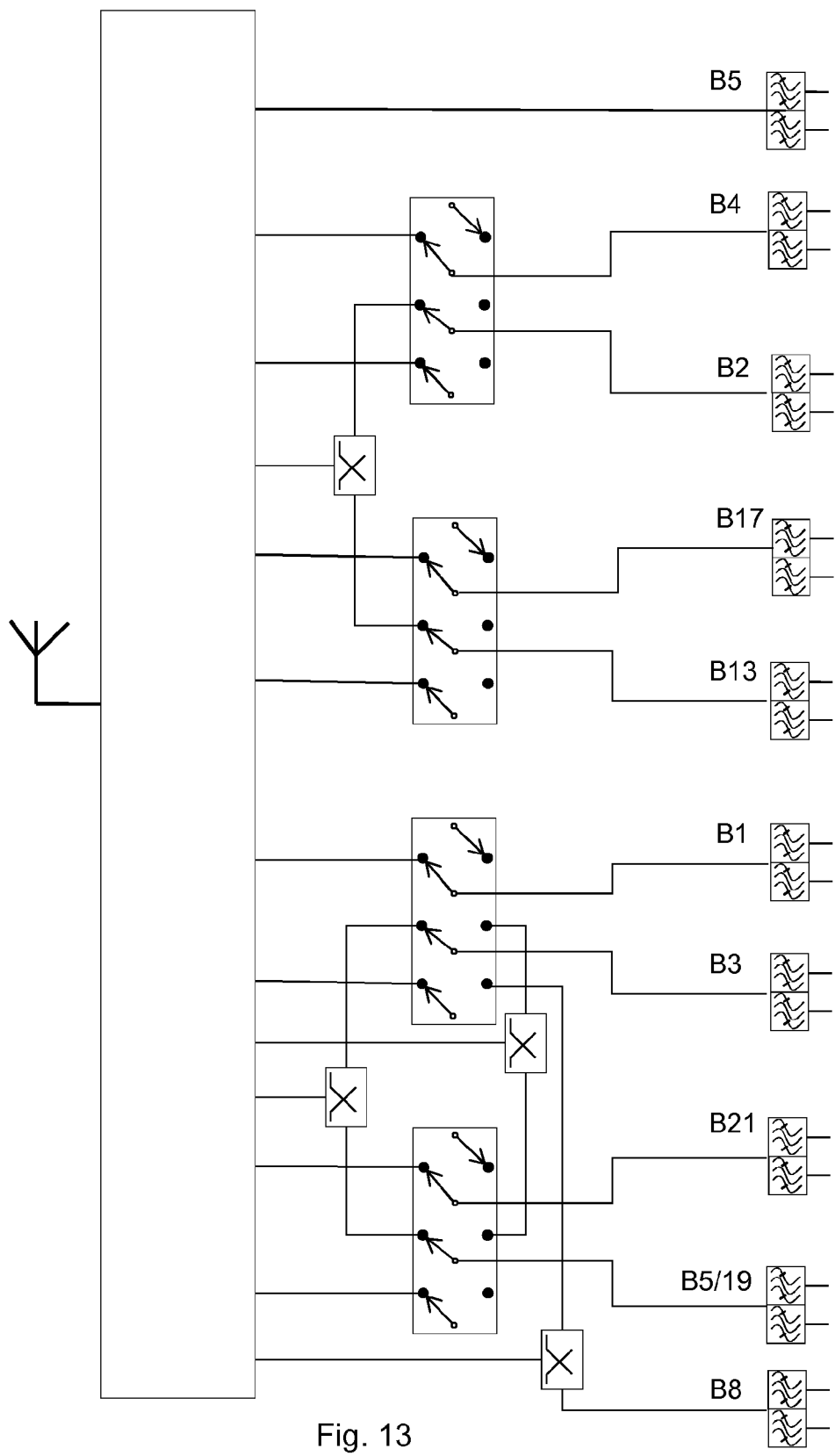

FIG. 13 depicts an arrangement in which 3GPP Bands 1, 2, 3, 4, 5, 8, 13, 17, 19 and 21 can be combined using four of the arrangements of FIG. 3. Bands 4 and 2 are connected to a first FIG. 3 arrangement for selective connection to a "high" side of a first diplexer. Bands 17 and 13 are connected to a second FIG. 3 arrangement for selective connection to a "low" side of the first diplexer. Bands 1 and 3 are connected to a third FIG. 3 arrangement for selective connection to a "high" side of a second diplexer or a "high" side of a third diplexer. Bands 21 and combined Band 5/19 filtering is connected to a fourth FIG. 3 arrangement for selective connection to a "low" side of the second or third diplexer. A fourth diplexer is provided to allow the combination of Band 3 and 8.

Figure 14:
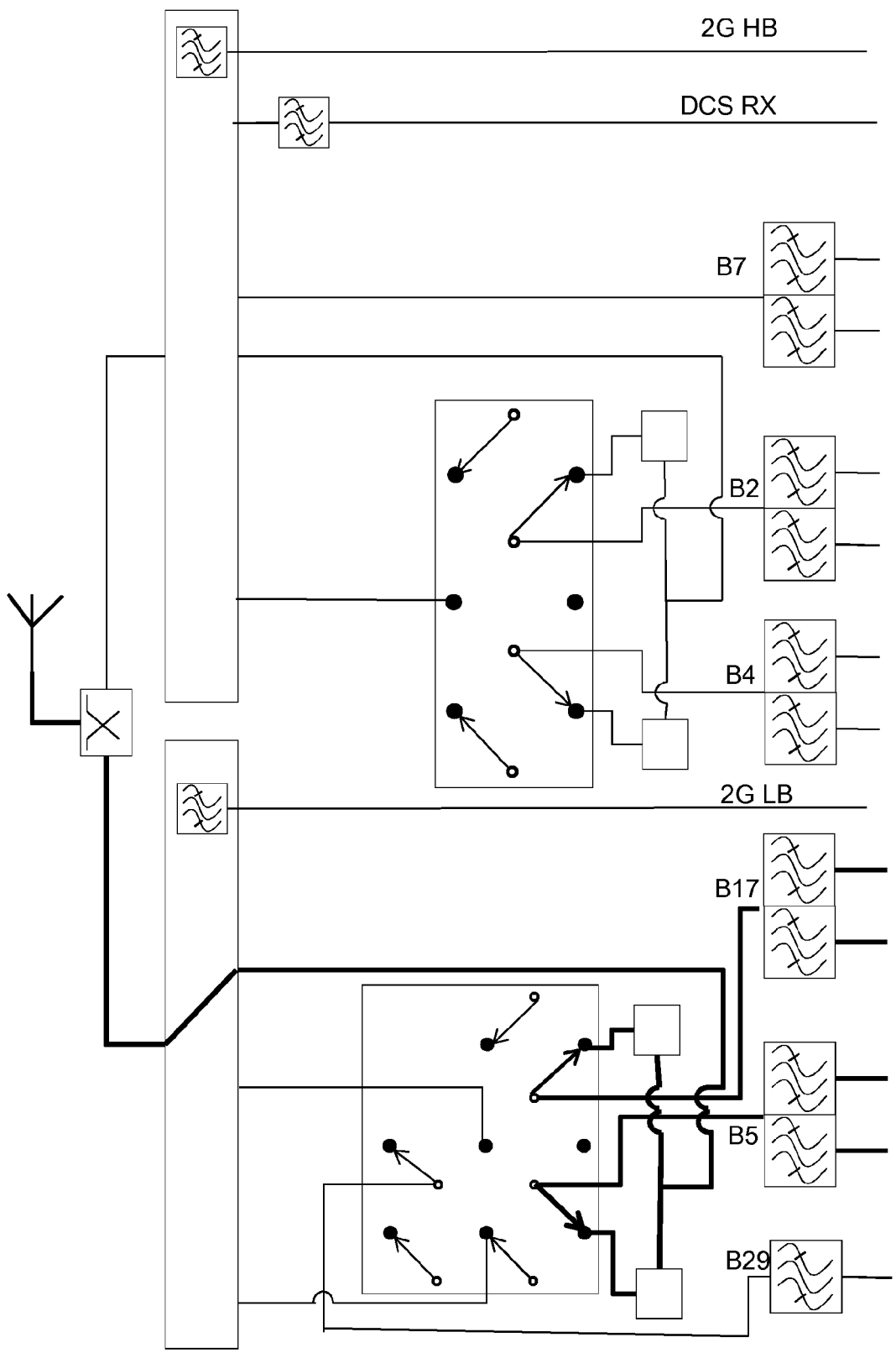

FIG. 14 depicts an arrangement in which 3GPP Bands 2, 4, 5, 17 and 29 can be combined. A diplexer is permanently in the signal path from the antenna with its high and low outputs connected by respective antenna switches.

Figure 15:
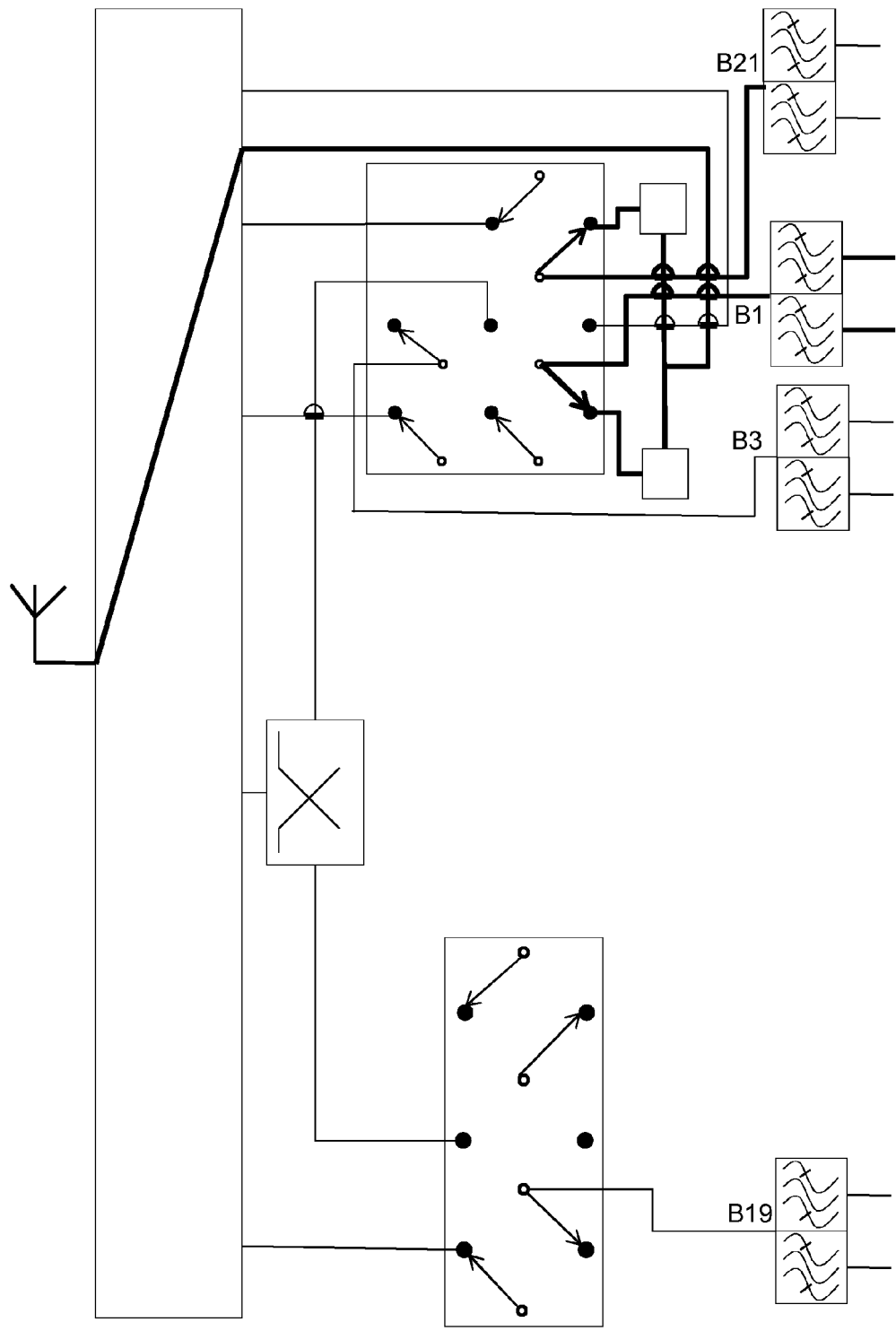

FIG. 15 depicts an arrangement in which 3GPP bands 1, 3, 19 and 21 can be combined as 1+21, 19+1, 19+3 and 19+21. Bands 1, 3 and 21 are selectively connected to the "high" side of a diplexer using an arrangement as depicted in FIG. 6. Band 19 is selectively connected to the "low" side of the diplexer. Bands 1 and 21 can be combined by switching matching into the signal path, as depicted in FIG. 15.

The above embodiments can be applied to the radio module of a user equipment or wireless device, as depicted schematically in FIG. 15. In this case the user equipment is in the form of a mobile phone/smartphone 201. The user equipment 201 contains the necessary radio module 202, processor(s) and memory/memories 203, first antenna 204 and second antenna 204', etc. to enable wireless communication with the network. The user equipment 201 in use is in communication with a radio mast 205 or alternative communication counterpart, such device to device communication. As a particular example in the context of UMTS (Universal Mobile Telecommunications System), there may be a network control apparatus 206 (which may be constituted by for example a so-called Radio Network Controller) operating in conjunction with one or more Node Bs (which, in many respects, can be regarded as "base stations"). As another example, LTE (Long Term Evolution) makes use of a so-called evolved Node B (eNB) where the RF transceiver and resource management/control functions are combined into a single entity. The term "base station" is used in this specification to include a "traditional" base station, a Node B, an evolved Node B (eNB), or any other access point to a network, unless the context requires otherwise. The network control apparatus 206 (of whatever type) may have its own processor(s) 207 and memory/memories 208, etc.

More specifically, embodiments of the invention can be applied to the radio module 204 so that the antenna 204, 204' or antenna system 204, 204' can be used by several frequency bands either in isolation or in combinations of frequency bands used for carrier aggregation and MIMO.

Figure 16:
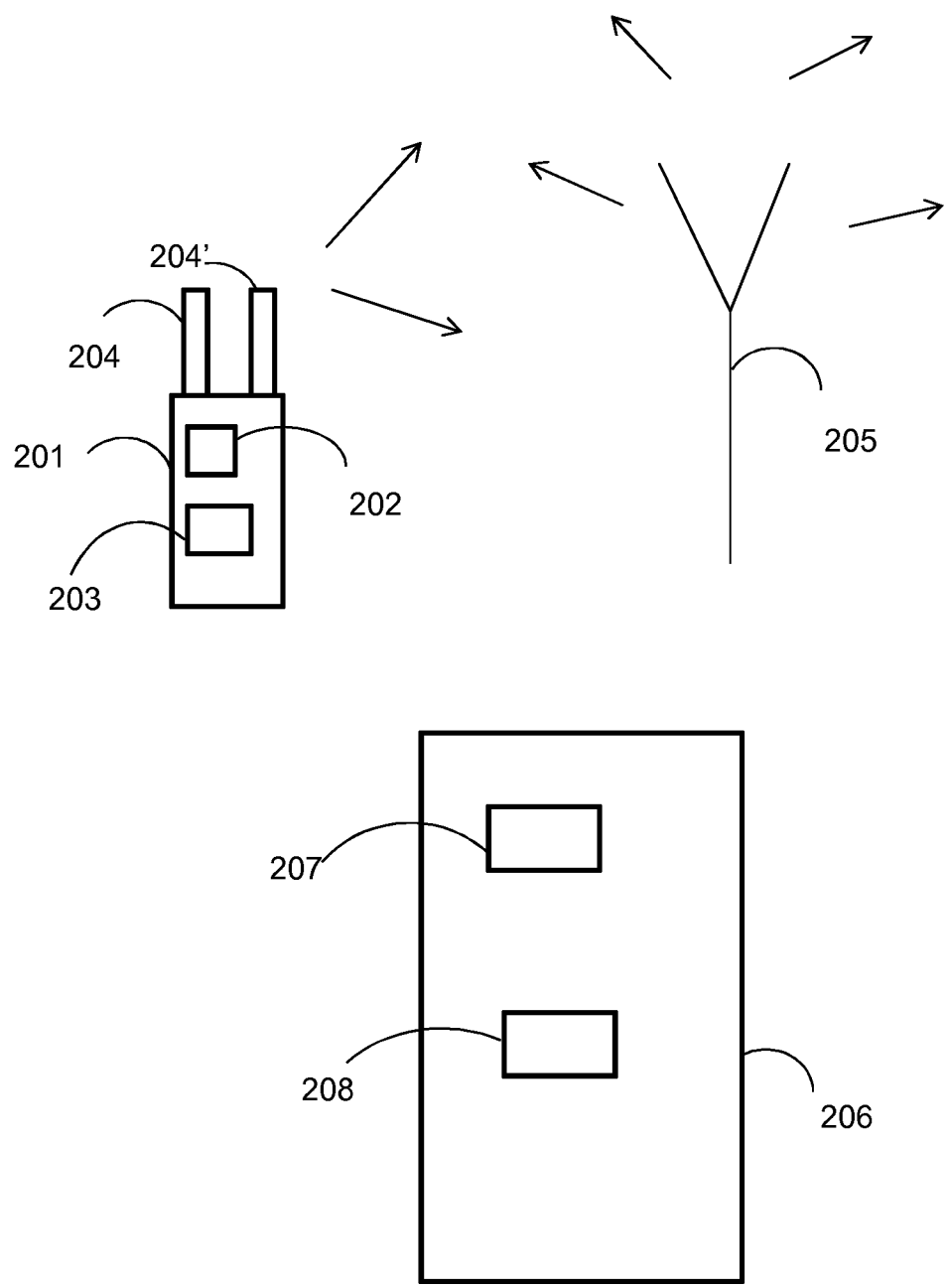
FIG. 16 is a diagrammatic representation of a user equipment in a wireless network in which embodiments of the invention can be used.
Figure 17:
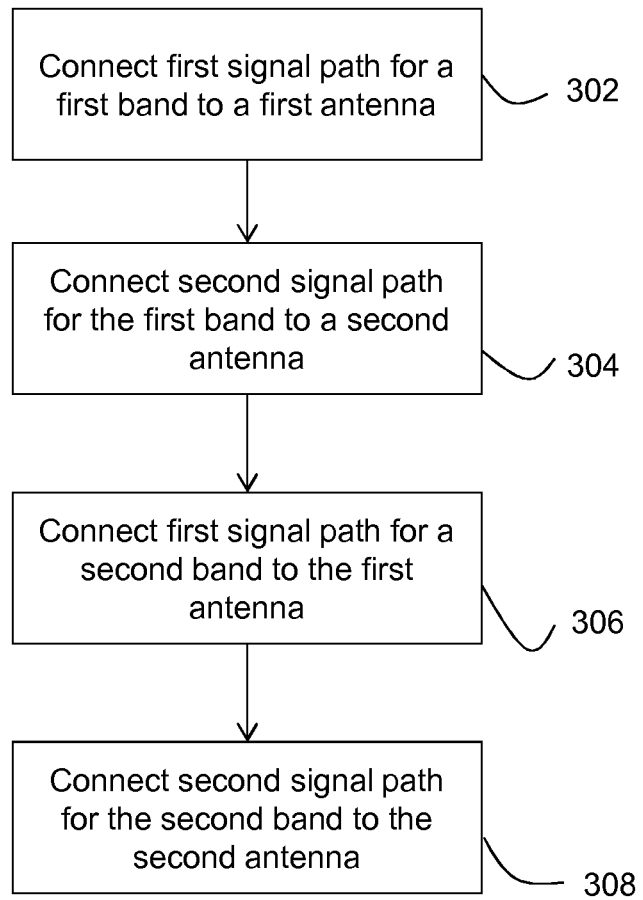
FIG. 17 is a flow chart of the method of an embodiment of the invention.

FIG. 16 depicts a flow chart of the general method of the invention, to allow two antennas to each be shared by two frequency bands. First, at step 302, a first signal path for first frequency band is connected to a first antenna. Then, at step 304, a second path for the first frequency band is connected to a second antenna. The first and second signal paths for the first frequency band have respective, different frequency responses. For example one can be duplex and the other simplex. Next, at step 306, a first signal path for a second frequency band is connected to the first antenna. Then, at step 308 a second signal path for the second frequency band is connected to the second antenna. The first and second signal paths for the second frequency band have respective, different frequency responses. The first and second frequency bands can now be used at the same time, sharing the first and second antennas. In some embodiments a frequency selective component, for example a frequency division multiplexer can be included in the signal paths.

Although the steps of FIG. 16 have been described sequentially in a particular order, other embodiments may carry out two or more of the steps simultaneously or in a different order.

All of the above embodiments have discussed examples in which two antennas are shared. The invention is not limited to only two antennas and other embodiments may share three, four or more antennas using the principles discussed above. For example, using more antennas will provide further signal paths for UL CA, DL CA, Multi carrier operation, diversity or MIMO.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A radiofrequency (RF) front end system comprising:
a first filter for a first frequency band;
a second filter for the first frequency band, the second filter having a frequency response characteristic that is different from a frequency response characteristic of the first filter where the second filter receives a different signal within the first frequency band than the first filter, the different signals received by the first filter and the second filter being intra-band carrier aggregation (CA) signals within the first frequency band;
a third filter for a second frequency band;
a fourth filter for the second frequency band, the fourth filter having a frequency response characteristic that is different from a frequency response characteristic of the third filtering; and
a switching system configured to selectively connect filters to plural antennas such that at a particular time the first and third filters are connected to a first antenna and the second and fourth filters are connected to a second antenna,
wherein the switching system comprises a first portion for selective connection of the first and third filter to the first antenna and a second portion for selective connection of the second and fourth filter to the second antenna; and wherein the first portion is separate from the second portion.

2. The RF front end system according to claim 1, wherein each of the first and third filters is a duplex filter and each of the second and fourth filters is a simplex filter.

3. The RF front end system according to claim 1, wherein each of the first and fourth filters is a duplex filter and each of the second and third filters is a simplex filter.

4. The RF front end system according to claim 2, wherein the simplex filter is configured for signals in the reception direction only.

5. The RF front end system according to claim 2, wherein the duplex filter is frequency division duplex filter.

6. The RF Front end system according to claim 1, wherein the switching system is configured to selectively connect at least one of:
the first filter alone to the first antenna,
the second filter alone to the second antenna,
the third filter alone to the first antenna, and
the fourth filter alone to the second antenna.

7. The RF front end system according to claim 1, comprising:
a first frequency division multiplexer associated with the first and third filter; and
a second frequency division multiplexer associated with the second and fourth filter.

8. The RF front end system according to claim 7, wherein the switching system comprises:
an antenna switch;
a first single pole switch having:
a pole connected, directly or indirectly, to the first filter, first contact point connected, directly or indirectly, to the antenna switch; and
a second contact point connected, directly or indirectly, to a first filtered terminal of the first frequency division multiplexer; and a second single pole switch having:
  a pole connected, directly or indirectly, to the third filter,
  a first contact point connected, directly or indirectly, to the antenna switch, and
  a second contact point connected, directly or indirectly, to a second filtered terminal of the first frequency division multiplexer.

9. The RF front end system according to claim 8, wherein the switching system comprises:
  a second antenna switch;
  a third single pole switch having:
    a pole connected, directly or indirectly, to the second filter,
    a first contact point connected, directly or indirectly, to the second antenna switch; and
    a second contact point connected, directly or indirectly, to a first filtered terminal of the second frequency division multiplexer; and
  a fourth single pole switch having:
    a pole connected, directly or indirectly, to the fourth filter,
    a first contact point connected, directly or indirectly, to the second antenna switch, and
    a second contact point connected, directly or indirectly to a second filtered terminal of the second frequency division multiplexer.

10. The RF front end system according claim 1, comprising:
  fifth filter for a third frequency band;
  sixth filter for the third frequency band, the sixth filtering having a frequency response characteristic that is different from a frequency response characteristic of the fifth filter;
  seventh filter for a fourth frequency band; and
  eighth filter for the fourth frequency band, the eighth filter having a frequency response characteristic that is different from a frequency response characteristic of the seventh filter;
  wherein the switching system is configured to selectively connect filters to plural antennas such that at a particular time the fifth and seventh filter is connected to the first antenna and the sixth and eighth filter is connected to the second antenna.

11. A mobile apparatus comprising:
  a radiofrequency (RF) front end system;
  a first antenna connected to the RF front end system; and
  a second antenna connected to the RF front end system;
  wherein the RF front end system comprises:
    a first filter for a first frequency band;
    a second filter for the first frequency band, the second filter having a frequency response characteristic that is different from a frequency response characteristic of the first filter, where the second filter receives a different signal within the first frequency band than the first filter, the different signals received by the first filter and the second filter being intra-band carrier aggregation (CA) signals within the first frequency band;
    a third filter for a second frequency band;
    a fourth filter for the second frequency band, the fourth filter having a frequency response characteristic that is different from a frequency response characteristic of the third filter; and
    a switching system configured to selectively connect filters to plural antennas such that at a particular lime the first and third filters is connected to the first antenna and the second and fourth filters is connected to the second antenna,
  wherein the switching system comprises a first portion for selective connection of the first and third filter to the first antenna and a second portion for selective connection of the second and fourth filter to the second antenna; and wherein the first portion is separate from the second portion.

12. The mobile apparatus of claim 11, each of the first and third filters is a duplex filter and each of the second and fourth filters is simplex filter.

13. The mobile apparatus of claim 11, wherein each of the first and fourth filters is a duplex filter and each of the second and third filters is a simplex filter.

14. The mobile apparatus according to claim 12, wherein the simplex filter is configured for signals in the reception direction only.

15. The mobile apparatus according to claim 12, wherein the duplex filter is frequency division duplex filter.

16. The mobile apparatus according to claim 11, wherein the switching system is configured to selectively connect at least one of:
  the first filter alone to the first antenna,
  the second filter alone to the second antenna,
  the third filter alone to the first antenna, and
  the fourth filter alone to the second antenna.

17. The mobile apparatus according to claim 11, wherein the RF front end system further comprises:
  a first frequency division multiplexer associated with the first and third filters; and
  a second frequency division multiplexer associated with the second and fourth filters.

* * * * *

UNITED STATES PATENT AND TRADEMARK OFFICE
CERTIFICATE OF CORRECTION

PATENT NO. : 9,444,609 B2  
APPLICATION NO. : 14/243151  
DATED : September 13, 2016  
INVENTOR(S) : Seppo Olavi Rousu It is certified that error appears in the above-identified patent and that said Letters Patent is hereby corrected as shown below:

In the Claims

Column 18, Line 16, Claim 11, change "filters to plural antennas such that at a particular lime" to --filters to plural antennas such that at a particular time--.

Signed and Sealed this  
Twenty-second Day of August, 2017

Joseph Matal  
*Performing the Functions and Duties of the*  
*Under Secretary of Commerce for Intellectual Property and*  
*Director of the United States Patent and Trademark Office*